United States Patent [19]
Harris et al.

[11] 3,794,742

[45] Feb. 26, 1974

[54] COATING COMPOSITION FOR FOODS AND METHOD OF IMPROVING TEXTURE OF COOKED FOODS

[75] Inventors: Norman E. Harris, Waltham; Frances H. Lee, Natick, both of Mass.

[73] Assignee: The United States of America as represented by the Secretary of the Army, Washington, D.C.

[22] Filed: Mar. 21, 1972

[21] Appl. No.: 236,588

[52] U.S. Cl.............. 426/302, 106/197 R, 426/92, 426/305, 426/382
[51] Int. Cl..................................................... A23b 1/10
[58] Field of Search......... 99/169, 166, 208, 1, 166; 106/197 R

[56] References Cited
UNITED STATES PATENTS

| | | |
|---|---|---|
| 3,669,674 | 6/1972 | Klug et al. .............................. 99/1 |
| 2,887,382 | 5/1959 | Rivoche ................................... 99/1 |
| 3,471,303 | 10/1969 | Hamdy et al. ......................... 99/166 |
| 3,165,416 | 1/1965 | Sleeth et al. ............................ 99/169 |
| 3,114,639 | 12/1963 | Rivoche ................................... 99/1 |
| 3,248,232 | 4/1966 | Krajewski ............................ 99/169 |

OTHER PUBLICATIONS

Condensed Chem. Dict., 7th Ed., 1966, Page 496

*Primary Examiner*—Morris O. Wolk
*Assistant Examiner*—Sidney Marantz
*Attorney, Agent, or Firm*—Edward J. Kelly; Herbert Berl; Charles C. Rainey

[57] ABSTRACT

A method of improving the texture of meat or other solid foods by reducing the loss of moisture from the foods during cooking thereof and a coating composition for such foods to be applied thereto prior to cooking, said coating composition comprising a mixture of a hydroxypropylmethylcellulose, dextrose, hydrolyzed cereal solids, and a pregelatinized tapioca starch.

4 Claims, No Drawings

COATING COMPOSITION FOR FOODS AND METHOD OF IMPROVING TEXTURE OF COOKED FOODS

The invention described herein may be manufactured, used, and licensed by or for the Government for governmental purposes without payment to us of any royalty thereon.

This invention relates to coating compositions for application as coatings to meats and other solid foods which require cooking before being consumed, more particularly to rehydrated freeze-dried meats, prior to cooking thereof, whereby the moisture in the food is better retained through the cooking thereof than when the food is cooked without being coated, or is coated only with flour, before cooking and the resulting cooked food has an improved texture over similar food which is cooked without being coated with the coating composition of the invention. The invention also relates to the method of improving the texture and moisture retention of fresh meat prepared using the coating composition of the invention to seal the moisture in the meat during the cooking thereof.

Numerous foods today are preserved by freeze-vacuum-dehydration to reduce the moisture content thereof to such a low level that microorganisms cannot proliferate in the freeze-vacuum-dehydrated food products and also to make the foods lighter. Some of these foods are dehydrated in the raw state and, therefore, require cooking after being reconstituted (rehydrated) to substantially the moisture content they possessed prior to freeze-vacuum-dehydration thereof. However, as a result of certain cellular changes which occur during freezing and freeze-vacuum-dehydration, the foods in many, if not most, cases have different moisture-holding capacities after reconstitution than the same type of food has in its natural state, and consequently the reconstituted food usually gives up its moisture more readily during and after cooking than the natural food does and produces a cooked food of relatively dry, and relatively hard, less desirable texture than the cooked natural food. This is a particularly serious problem with meats. The problem of moisture loss during cooking also exists with fresh meats, but is not as severe a problem as in the case of freeze-dried meats.

It is an object of the invention to provide a dry, powdery composition which is dispersible in water to form an aqueous dispersion which is useful for coating a meat or other solid food prior to cooking thereof.

Another object of the invention is to provide a method of improving the texture and moisture retention properties of a cooked meat or other solid food.

Other objects and advantages will be apparent from the following description of the invention, and the novel features will be particularly pointed out in connection with the appended claims.

The dry, powdery composition of the invention is prepared by mixing in the dry state finely powdered hydroxypropylmethylcellulose, dextrose, low D. E. hydrolyzed cereal solids, and a pregelatinized tapioca starch.

D. E. represents dextrose equivalent. The hydrolyzed cereal solids employed in the composition of the invention preferably have D. E. values from about 9 to about 13.

The hydroxypropylmethylcellulose is characterized by having from about 84 percent to about 93 percent of the alkoxyl groups attached to the anhydroglucose rings in the form of methoxyl groups and the remaining alkoxyl groups attached to the anhydroglucose rings in the form of 2-hydroxypropoxyl groups. The hydroxypropylmethylcellulose of the type employed in the dry, powdery composition of the invention is described in the "Food Chemicals Codex," First Edition, 1966, Publication 1406 of The National Academy of Sciences — National Research Council, Washington, D.C. and in "The National Formulary," 13th Edition, 1970. Several hydroxypropylmethylcellulose products having different ratios of the 2-hydroxypropoxyl groups to the methoxyl groups and different viscosities are manufactured by The Dow Chemical Company, Midland, Mich., and sold under the tradename "Methocel HG." For use in connection with foods, the premium grades of these products are employed.

Dextrose is available in a dry, powdery state from numerous sources. It is used in the dry, powdery composition largely for the purpose of producing browning of the cooked food by reaction of its carbonyl group with amino groups of proteins contained in foodstuffs. It may be omitted from compositions used in coating vegetables in which browning may be undesirable.

A low D. E. hydrolyzed cereal solids product which is useful in the dry, powdery composition of the invention is manufactured by Corn Products Industrial Division, Corn Products Company, Englewood Cliffs, N.J. under the tradename "Mor-Rex." "Mor-Rex," or its equivalent "Maltrin" 10, is employed in the dry, powdery composition mainly as a spacing agent for the purpose of reducing agglomeration and improving wettability of the hydroxypropylmethylcellulose when the composition is dispersed in water. The hydroxypropylmethylcellulose in the dry powdery composition remains more easily dispersible in water while in storage in the dry state over long periods of time with hydrolyzed cereal solids present in the composition and the composition is readily dispersible in water to produce an aqueous dispersion which produces a uniform coating on the food so that when the coated food is cooked, moisture is well-retained and the texture of the cooked food is greatly improved over that of a similar food product cooked without prior application of such a coating. Similarly, if the fresh food or reconstituted freeze-dried food is dredged in the dry, powdery composition, a relatively smooth coating is produced because of the presence of the hydrolyzed cereal solids in the dry, powdery composition. Thus the coating of the hydroxypropylmethylcellulose on the food is made more uniform and the moisture present in the fresh food or reconstituted food is held in during cooking thereof to such a degree that the texture of the cooked food is markedly improved. This is particularly evident in the case of meats.

Pregelatinized tapioca starch is manufactured by A. E. Staley Mfg. Co., Decatur, Ill. and sold under the tradename "Redisol 412." It is a precooked tapioca starch used in connection with various food products as a thickener-stabilizer.

The concentration of the hydroxypropylmethylcellulose in the dry, powdery composition may be varied from about 1 percent to about 50 percent. The limiting factors with respect to this are that there be enough of the hydrolyzed cereal solids and the pregelatinized tapioca starch present to cause production of a good dispersion of the hydroxypropylmethylcellulose in water and enough water present to produce a smooth, nonviscous, and uniform coating of the hydroxypropylmethylcellulose over the entire exterior surface of the food prior to the cooking thereof and that there be enough dextrose present to produce the desired degree of browning of the cooked food under the cooking conditions to which the food is exposed. In general, it has been found desirable to have approximately equal proportions of the dextrose, the hydrolyzed cereal solids, and the pregelatinized tapioca in the remainder of the dry, powdery composition after the percentage of hydroxypropylmethylcellulose is selected. However, changes may be made in these proportions depending on the type of cooking procedure to be used, the desirability of more or less browning of the surface of the cooked food product desired, and whether the food is to be dipped in an aqueous dispersion of the composition prior to cooking or dredged in the dry, powdery composition in the same manner as in the conventional dredging of meats in flour prior to frying thereof or baking, broiling, or roasting in certain cases.

The preferred dry, powdery composition for use in the method of the present invention is as follows:

| INGREDIENT | PERCENTAGE (by weight) |
| --- | --- |
| Hydroxypropylmethylcellulose | 3.25 |
| Dextrose | 32.25 |
| Hydrolyzed cereal solids, D. E. 9–13 | 32.25 |
| Pregelatinized tapioca starch | 32.25 |

When an aqueous dispersion of the above preferred dry, powdery composition is to be used for coating a food prior to cooking, it may be prepared in a wide range of concentrations as low as about 2 percent, or possibly even lower in some cases, and as high as about 25 percent, or even higher. In fact, the composition may be applied to the food in the dry, powdery state by dredging the food in the dry, powdery composition in much the same manner as is employed with flour in conventional cooking practices.

Whenever percentages are referred to in the specification and claims, it is intended that the percentages be by weight.

Having described the invention in general terms above, we will now proceed to illustrate the invention by means of specific examples of dry, powdery compositions for use in accordance with the invention and of the use of such compositions in the production of cooked meats having improved textures over that of similarly cooked but uncoated meat, or meat which has been coated only with flour according to conventional practices prior to cooking thereof. It will be understood, of course, that the above-described and other advantages of our invention may also be accomplished by suitable variations of the conditions, about to be set forth below, which are intended to be for illustrative purposes, and not for purposes of limiting the scope of our invention.

EXAMPLE 1

A dry, powdery composition was prepared by thoroughly mixing together in the dry state each of the following materials in the proportions shown:

| | |
| --- | --- |
| "Methocel" 60HG, 50 cps viscosity, Premium | 3.25% |
| Dextrose | 32.25% |
| "Mor-Rex" Code 1918 Hydrolyzed Cereal Solids, D.E. 10–13 | 32.25% |
| Staley "Redisol" 412 Precooked Tapioca Starch | 32.25% |

The "Methocel" 60HG, is a hydroxypropylmethylcellulose manufactured by The Dow Chemical Company, Midland, Mich. The "Mor-Rex" Code 1918 Hydrolyzed Cereal Solids as a low D. E. hydrolyzed cereal solids product derived from waxy sorghum and manufactured by Corn Products Company. The Staley "Redisol" 412 is a pregelatinized (precooked) tapioca starch manufactured by A. E. Staley Mfg. Co., Decatur, Ill.

An aqueous dispersion of the above-described dry, powdery composition was made by mixing 2 grams thereof with 100 grams of water, thus producing a 1.96 percent dispersion on a weight basis. Slices of fresh lean top round beef were dipped in the dispersion, allowed to drain off excess dispersion and sauteed in a pan containing corn oil along with slices of fresh lean beef cut off the same part of the round, but which were not coated with the dispersion. The latter slices were used as controls. All of the slices of beef were sauteed on both sides to as nearly the same degree as possible, the objective being a medium rare degree of doneness. The moisture loss by each slice was determined by the difference between the original weight and the final weight after cooking. Average moisture loss for the coated slices was 10.6 percent. Average moisture loss for the control slices was 18.6 percent.

EXAMPLE 2

Slices of fresh lean top round beef were dredged in the dry, powdery composition prepared as described in Example 1 in substantially the same manner as is frequently employed with flour when a meat is to be sauteed. These coated slices were sauteed in a pan containing corn oil along with slices of fresh lean beef cut off the same part of the round, but which were not coated with the dry, powdery composition. The latter slices were used as controls. All of the slices of beef were sauteed on both sides to as nearly the same degree as possible, the objective being a medium rare degree of doneness. The moisture loss by each slice was determined by the difference between the original weight and the final weight after cooking. Average moisture loss for the coated slices was 8.9 percent. Average moisture loss for the control slices was 16.1 percent.

EXAMPLE 3

Twelve freeze-dried pork chops taken from as nearly the same part of a pork loin as possible were rehydrated by allowing them to stand in an excess of water at room temperature for one hour. The pork chops were then drained free of excess surface water. Six of the rehydrated pork chops were dredged in flour in the conventional manner for preparing fried pork chops, then in water, then in flour, and then fried in a pan containing about one-half inch of shortening. The other six rehydrated pork chops were dredged in flour, then dipped in a dispersion of the dry, powdery composition described in Example 1 prepared by mixing 7 grams of the dry, powdery composition with 93 grams of water, then dredging the coated pork chops in flour again and frying the pork chops in the same pan at the same time with the rehydrated pork chops which had been dipped in water and dredged in flour. All of the pork chops were cooked on both sides to as nearly the same degree as possible. When done the pork chops were held in a steam table for 30 minutes before being subjected to quality testing by a trained technological taste panel consisting of 12 members. The ratings of the pork chops were based on a quality scale wherein a rating is given from 1 to 9, a rating of 1 representing "extremely poor" and a rating of 9 representing "excellent," with ratings in between representing various gradations between the two extremes, a rating of 5.0 being generally considered as fair quality. An average was taken of the numerical ratings given by each of the twelve members of the panel for each of the 12 samples. The results showed that the panel gave an average rating of 7.16 for texture to the rehydrated pork chops which had been coated with the aqueous dispersion of the dry, powdery composition prior to being cooked; whereas an average rating of 6.41 for texture was given to the rehydrated pork chops which were dipped in water. Furthermore, with respect to overall flavor, the panel gave the rehydrated pork chops which had been coated with the dispersion described in Example 1 an average rating of 7.50, whereas the rehydrated pork chops which were dipped in water and dredged in flour in the conventional manner before being cooked were given an average rating for overall flavor of 6.75.

It is apparent that the technological panel preferred the rehydrated pork chops which had been coated with the 7 percent aqueous dispersion of the dry, powdery composition over similar rehydrated pork chops which had been dipped in water and dredged in flour in the conventional manner and then similarly fried, preference being expressed as to both texture and flavor. It has been observed that, in general, the more dried out a cooked meat becomes, the less desirable its texture becomes. Also, the degree of dryness after cooking has been observed to affect flavor in cooked meats.

The invention has been described above in terms of wide variations in the proportions of the various ingredients of the dry, powdery composition. The important consideration is that the meat which is treated by being coated prior to being cooked be given a continuous coating of the hydroxypropylmethylcellulose over its entire exposed surface. The more uniform the coating of hydroxypropylmethylcellulose, the more effective will be the retention of moisture by the meat during cooking thereof. This is where the importance of the other ingredients of the composition becomes apparent. The hydrolyzed cereal solids are very effective in preventing agglomeration of the hydroxypropylmethylcellulose in the aqueous dispersions; and the pregelatinized tapioca starch exercises a stabilizing effect on the dispersion. The dextrose produces better browning and appearance of the surface of the cooked meat. The overall effect of using either an aqueous dispersion of the composition or the dry, powdery composition itself (for dredging the meat in) is that a relatively inexpensive coating for either reconstituted (rehydrated) freeze-dried meats or fresh meats or frozen meats (preferably coated before freezing thereof) is obtained, which coating slows down the loss of moisture from the meat during storage, such as freezer burn, and during cooking, thus resulting in the production of a more moist cooked meat of better texture and, in most cases, better flavor.

It is to be understood that the dry, powdery composition of the invention as well as aqueous dispersions thereof may be applied to other foods prior to cooking thereof where the loss of moisture from the foods during cooking is important in determining the acceptability of the cooked foods, especially where texture plays a significant role in determining acceptability of the cooked foods. Hence, the dry, powdery composition of the invention will be applicable to and well worth the cost of coating any food with which there is a problem of too rapid or too great a loss of moisture during the cooking or storage thereof, especially where frying, baking, broiling or roasting or other types of dry cooking are applied to the food.

The dry, powdery composition of the invention is particularly useful to the Armed Forces for issuance along with packages of freeze-dried meats. Thus members of the Armed Forces are provided with a coating composition which can be mixed with water from any suitable source to make a dispersion of the coating composition which may then be applied to reconstituted meat just before the cooking thereof. As a result the cooked reconstituted meats prepared in the field have good texture and moisture retention which compare quite favorably with the texture and moisture retention of similar foods after cooking thereof in the natural state without prior dehydration and reconstitution. The dry, powdery composition of the invention may also be used in the same manner as flour is frequently used in coating meats before cooking thereof, the meat being dredged in the dry, powdery composition and then fried or baked or roasted as desired.

Another use of the dry, powdery composition of the invention is in the reduction of moisture losses from frozen meats so that, when the frozen meats are thawed and cooked, the cooked meat product will be more moist and, therefore, have a more desirable texture. This will be accomplished by dipping the fresh meat (as fresh as possible) in an aqueous dispersion of the dry, powdery composition of the invention or in the dry powder and then quick-freezing the coated meat. The relatively continuous coating of hydroxypropylmethylcellulose on the meat tends to prevent so-called freezer burn, which frequently occurs in frozen meats because of excessive removal of moisture from some parts of the surface of the meat during freezing or storage thereof at low temperatures.

We wish it to be understood that we do not desire to be limited to the exact details described, for obvious modifications will occur to a person skilled in the art.

We claim:

1. Method of improving the texture and moisture retention of a cooked meat prepared from uncooked, reconstituted freeze-vacuum-dehydrated meat comprising the steps of coating uncooked, reconstituted freeze-vacuum-dehydrated meat with an aqueous dispersion prepared from a dry, powdery composition comprising a mixture of a hydroxypropylmethylcellulose, dextrose, a hydrolyzed cereal solids product, and a pregelatinized tapioca starch and cooking the coated, uncooked, reconstituted freeze-vacuum-dehydrated meat until it is done to taste.

2. Method according to claim 1, wherein said hydroxypropylmethylcellulose comprises from about one percent to about 50 percent by weight of said dry, powdery composition and the remainder of said dry, powdery composition comprises approximately equal proportions of said dextrose, said hydrolyzed cereal solids product, and said pregelatinized tapioca starch.

3. Method according to claim 2, wherein said dry, powdery composition consists essentially of about 3.25 percent of said hydroxypropylmethylcellulose, about 32.25 percent of said dextrose, about 32.25 percent of said hydrolyzed cereal solids product, and about 32.25 percent of said pregelatinized tapioca starch, said percentages being by weight.

4. Method according to claim 2, wherein said aqueous dispersion comprises from about two percent to about twenty-five percent of said dry, powdery composition, the remainder of said aqueous dispersion being water.

* * * * *